Nov. 9, 1948.　　　　C. M. BOLSER　　　　2,453,405
REPACKABLE ADJUSTABLE OIL FILTER CARTRIDGE
Filed Nov. 23, 1944　　　　　　　　　　　　2 Sheets-Sheet 1
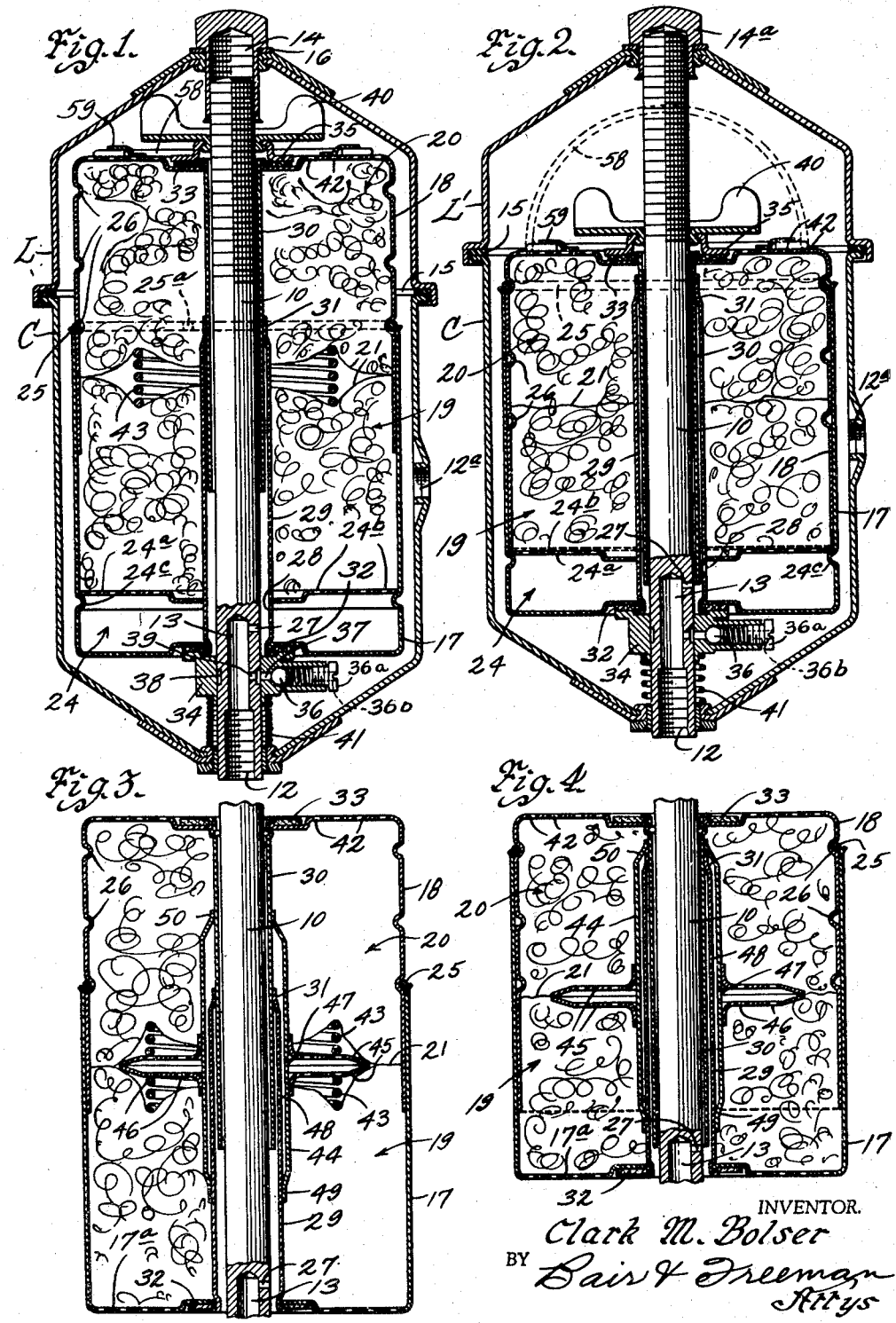
INVENTOR.
Clark M. Bolser
BY Bair & Freeman
Attys

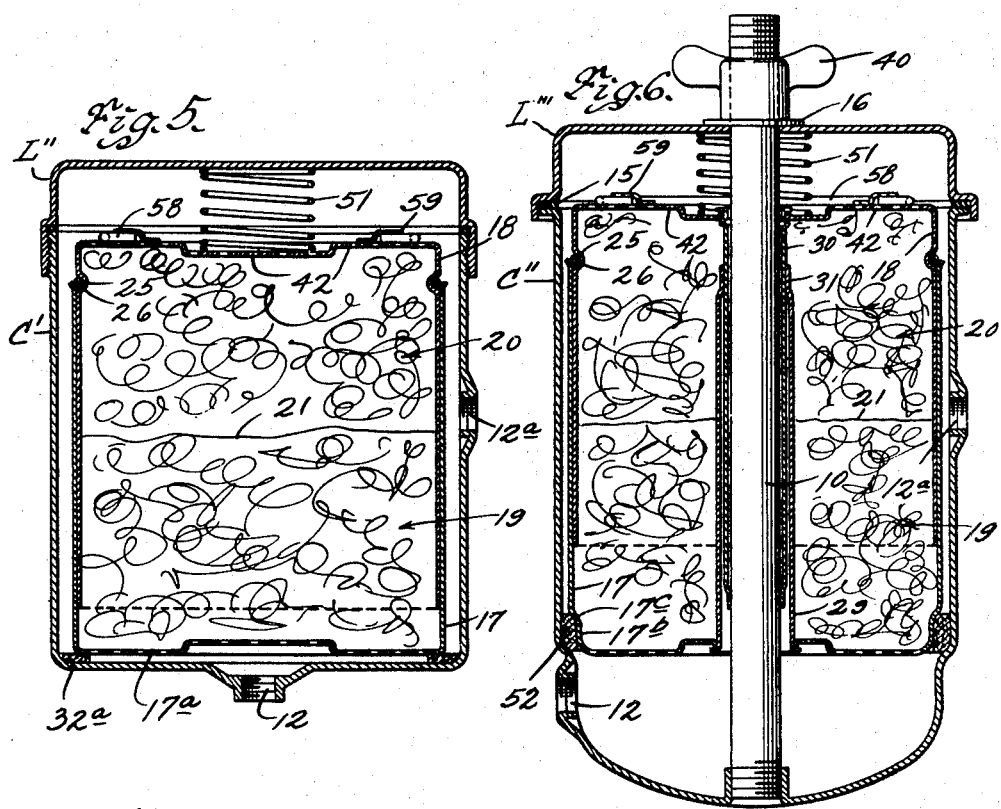
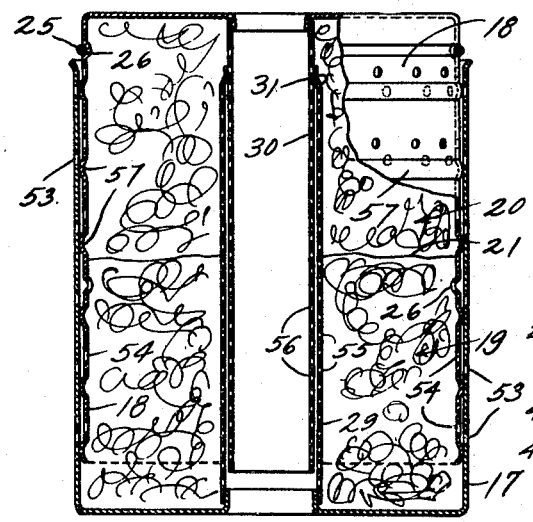
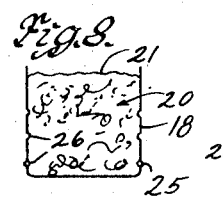
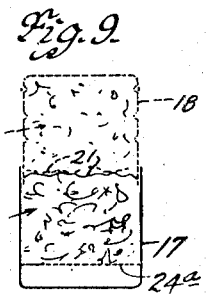
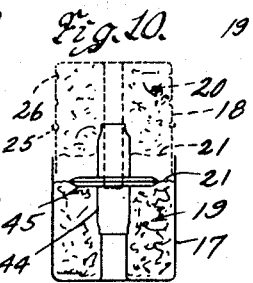

Patented Nov. 9, 1948

2,453,405

UNITED STATES PATENT OFFICE 2,453,405

REPACKABLE ADJUSTABLE OIL FILTER CARTRIDGE

Clark M. Bolser, Cedar Falls, Iowa

Original application December 14, 1940, Serial No. 370,096. Divided and this application November 23, 1944, Serial No. 564,819

5 Claims. (Cl. 210—131)

My present invention relates to an oil filter cartridge wherein the filtering material is repackable and wherein the cartridge itself is adjustable to fit in different sizes of casings, as for passenger car operation, small truck operation and large truck operation, depending upon the quantity of oil in the oil system of the engine, the present application being a division of my copending application, Serial No. 370,096, filed December 14, 1940, now Patent No. 2,364,617.

One object of the invention is to provide a means whereby the filtering material may be removed from a used oil filter cartridge and discarded and fresh material packed into the cartridge in a minimum of time and with an expense equal only to the cost of the filtering material itself, which may be ordinary "waste" of the variety formed from cotton fibers and usually used for wiping oil and grease from machinery.

Another object is to provide an oil filter cartridge which consists of a pair of filtering material containers each having an open end, which containers telescope together with sufficient telescoping extent that each may be partially filled with a quantity of filtering material and the containers thereupon telescoped together for enclosing the filtering material and compacting it to the desired extent, after which the cartridge may be readily placed in the usual oil filter casing to perform its intended function.

Still another object is to provide a repackable cartridge which may be adjusted to any one of several sizes by slipping a spring ring into the proper groove of one of the containers so as to limit the telescoping movement, the containers being subsequently filled with the proper amount of filtering material to suit the size to which the cartridge has been adjusted; the cartridge, due to its adjustment, being thereby usable in any one of a plurality of sizes of filter casings.

A further object is to provide a cartridge of the general character above described with a self contained sump to catch debris or sludge before it passes through the filtering material of the cartridge.

Still further objects are to provide an oil filter wherein a change in the size of a lid may change the size of the filter to accommodate a different size of filter cartridge; to provide an insert in the form of an oil distributor where it is desirable to discharge the oil into the filtering material at the center of its mass; to provide means for associating a gasket with a cartridge of the metal container type for replacement in place of the usual "sock" type of filter cartridge; and to provide a telescopically adjustable, strainer type oil filter cartridge wherein oil flows from the outside toward the inside, with means to insure proper flow of oil through the perforations of the telescoping parts of the cartridge.

The foregoing, other and further objects of my present invention will be apparent to those skilled in the art to which this invention appertains, by reference to the following description, accompanying drawings and appended claims. Embodiments of the invention are illustrated in the accompanying drawings, wherein the views thereof are as follows:

Figure 1 is a vertical sectional view through an oil filter embodying my invention and showing my repackable adjustable oil filter cartridge therein;

Figure 2 is a similar sectional view showing the cartridge adjusted to a different size and the casing of the oil filter made smaller by the substitution of another size of lid on the casing;

Figure 3 is a sectional view through a modified form of the cartridge showing a central oil distributor and the cartridge at maximum adjustment;

Figure 4 is a similar view showing the cartridge of Figure 3 at minimum adjustment;

Figure 5 is a sectional view through an oil filter showing a simplified type of my repackable oil filter cartridge omitting the adjusting feature;

Figure 6 is a sectional view through another oil filter of the type usually receiving a "filter sock" as a repackable cartridge, with my cartridge replacing the "sock" type cartridge;

Figure 7 is a sectional view through a filter cartridge of my repackable and adjustable type designed for a strainer type of filter wherein oil enters from the outside and is discharged from the inside of the cartridge;

Figure 8 is a diagrammatic view showing the upper container of the filter cartridge of Figure 1 packed with a quantity of filtering material;

Figure 9 is a similar view showing the lower half of the cartridge packed with filtering material and showing by dotted lines the upper part of Figure 8 associated with the lower part before telescoping the parts together, and Figure 10 is a view similar to Figure 9 showing how the cartridge of Figures 3 and 4 is repacked.

On the accompanying drawings I have used the reference character C to indicate a filter casing and L a lid therefor in Figure 1. In Figure 2, the casing C has a lid L' of less depth, so that the filter casing is smaller and the entire filter therefor of less capacity than the arrangement shown in Figure 1. The lid L is retained on the casing C by a tie rod 10 having an oil inlet 12 in the lower end thereof and communicating with a bore 13. The upper end of the tie rod is threaded to receive a tubular nut 14 carried by the lid L, whereby the casing and lid are held assembled. A gasket 15 is provided between the casing and the lid and a gasket 16 is provided between the lid and the head of the tubular nut 14 to prevent leakage. The casing C is provided with an oil outlet 12a.

The difference of the lid L' of Figure 2 from the lid L of Figure 1 is that it is of less depth and the tubular nut 14a need not be of as great length. This arrangement permits the use of one size of casing C and different sizes of lids to provide different sizes of filter casings, thus cutting down the size of the dealer's stock.

On the tie rod 10, I provide my repackable adjustable oil filter cartridge comprising a lower container 17 and an upper container 18. The containers 17 and 18 are open ended, with their open ends toward each other when the containers are telescoped together. A quantity of filtering material 19 is provided in the container 17 and a similar quantity of filtering material 20 is contained in the container 18. The parting line between these quantities is shown at 21.

The container 17 has an inwardly directed bead 24c adjacent its lower end, on which a perforated partition plate 24a rests. The plate 24a provides below the bead of filtering material a sludge collecting space 24.

The containers 17 and 18 telescoping together as they do may be adjusted for different quantities of filtering material 19—20. For instance, in Figure 1 the adjustment is maximum, and in Figure 2 it is minimum. To limit the telescoping movement, a C-shaped ring 25 formed of spring steel wire with its break shown at 25a is movable into any one of a plurality of inwardly directed beads 26. The filter cartridge may thus be initially adjusted for the proper size when installed in a given filter casing, and thereafter when repacked and the containers 17 and 18 are telescoped together to their limit as determined by the wire ring 25 they will return to that size.

The type of filter shown in Figures 1 and 2 permits entry of oil from the bore 13 to a settling or sludge space 24, through a port 27 and through a port 28 in a tube 29 carried by the container 17 at its center. The tube 29 telescopes over a tube 30 carried at the center of the container 18. An oil-tight fit between the telescoping tubes 29 and 30 is provided by a constriction 31 of the tube 29.

The top of the sludge space 24 defined by a plate 24a has perforations 24b therein.

The filter cartridge is provided with gaskets 32 and 33 at its lower and upper ends contacting with a collar 34 and a washer 35, respectively. The collar 34 is part of a by-pass fitting which includes a spring biased check valve 36. The intake side of the check valve 36 communicates through a port 37 with an annular groove 38 in the tie rod 10, which in turn communicates through a port 39 with the bore 13. An outlet from the check valve 36 is provided through a passage 36a in an adjusting screw 36b. The washer 35 is carried by a wing nut 40 which screws onto the threaded portion of the tie rod 10 and slides the collar 34 downwardly against the bias of a spring 41 under the collar until the coils of the springs are closed.

The arrangement just described permits a "visible test" to determine whether a filter cartridge, after it has been repacked, operates properly. The nut 40 retains the cartridge in operating position and the motor may be started, whereupon if the cartridge performs its filtering operation properly the oil will bubble up through perforations 42 formed in the top of the container 18 and run down the outside of the cartridge to be discharged through the outlet 12a. This test may be performed while the lid L is removed, and thus the service station attendant may accurately determine the workability of the filter before closing the casing C.

With respect to repacking the filter cartridge, Figure 8 illustrates how the top container 18 may be packed with substantially half of the filtering material intended to be used for the repacking operation. Figure 9 shows by solid lines how the lower container 17 may be similarly packed. After the containers 17 and 18 have been packed with the filtering material, the container 18 is inverted to the dotted position of Figure 9 with the telescoping parts associated with each other. The containers may then be forced together to the limit of telescoping movement as determined by the position of the ring 25, whereupon the filtering material is compacted to the proper degree. The proper predetermined amount of filtering material of course is initially placed in the containers to secure the proper compaction when the containers are telescoped together with substantially equal amounts of the material in each container.

In Figures 3 and 4, I show a filter cartridge having many parts corresponding to the parts already described in connection with Figures 1 and 2. Such parts accordingly bear the same reference numerals. The additional feature in these two figures is an oil distributor consisting of a tube 44 and a pair of discs 45. The discs 45 provide a distributor space between them and have perforations 46 to permit discharge of oil in both upward and downward directions. The tube 44 has an opening at 47 to afford communication with the space within the tube 44 surrounding the tube 29. The tube 29 has an opening 48 to communicate oil from the bore 13 of the tie rod 10 through the port 27 and into the space between the tube 29 and the smaller tube 30.

The tube 44 has a construction at 49 to fit the tube 29, and another construction at 50 to fit the tube 30. This arrangement permits considerable leeway for telescoping of the tubes 29, 30 and 44 relative to each other and yet secure proper oil flow from the port 27 of the tie rod to the perforations 46 of the distributor discs 45. For instance, maximum adjustment of the oil filter cartridge is shown in Figure 3 and minimum adjustment in Figure 4, and it is obvious at each adjustment that oil flow is possible. In Figure 4, the spring 43 is omitted.

In each position of adjustment, it is desirable that the distributor discs 45 assume a substantially central position between the upper and lower ends of the cartridge. This is accomplished by placing half of the filtering material in the container 17, as shown by solid lines in Figure 10, then placing the distributor 44—45 in position, and then the upper container 18 with its half of the filtering material in position as shown by dotted lines. Thereafter, the containers may be telescoped together to their limit of telescoping movement as determined by the ring 25.

In Figure 5, I have shown a simplified arrangement of my repackable oil filter cartridge from which the adjustable feature has been omitted. The container 18 has but a single bead 26 to receive the ring 25 for limiting the telescoping movement. The oil filter casing is shown at C' and has a lid L" threaded thereon with a spring 51 interposed between the lid and the cartridge. The cartridge of this figure does not have the settling space 24 of Figure 1 but has rather a perforated bottom member 17a to receive oil from the inlet 12. The oil passes up through the perforations 42 of the top of the cartridge and out through the outlet 12a, as in Figure 1.

In some filters, a casing such as C" of Figure 6 is provided and is adapted to receive a "sock" type of filter cartridge consisting of a filter mass contained in a fabric cover. After a cartridge of this type has been compressed into position to avoid oil leakage around its periphery and then used for a while, it can be removed only by cutting it up and digging it out of the casing. In Figure 6, I show a filter cartridge of my repackable type which may be substituted for the "sock" type cartridge. My cartridge is of the same general construction as described in connection with Figures 1 and 5, with the addition of a restricted portion 17b of the container 17 having an inclined shoulder 17c. A ringlike gasket 52 surrounds the restriction 17b and is adapted to be forced against an inclined shoulder 53 of the casing C" for the purpose of providing a sealing engagement, the gasket being expanded as the filter cartridge is forced downwardly as by the spring 51. Thus a sealing engagement is provided between my cartridge and the casing C".

In Figure 7, I show my cartridge adapted for that type of filtering operation wherein the oil flows inwardly from the outer wall of the cartridge toward the center tubes thereof. The containers 17 and 18 and the tubes 29 and 30 of Figure 1 are modified to the extent that the telescoping outer walls of the containers are perforated as at 53 and 54, and the tubes are perforated as at 55 and 56. Also, the outer wall of the container 18 is provided with outwardly struck annular beads 57 adapted to space the telescoping walls of the containers from each other to permit oil to flow between them from the openings 53 to the openings 54. Two of the in-struck beads 26 are provided for adjustment, and the adjusting ring for selective coaction with them is indicated at 25 as in Figure 1.

In a filter cartridge of this type, telescoping the two containers together where oil must flow through the telescoping walls presents the problem of either making an arrangement for accurately aligning the holes with each other or permitting oil to flow when they are not aligned. The space between the walls provided by the presence of the beads 57 accomplishes the desired result, while offsetting of the openings 53 by different spacing from that of the beads 57 insures that even if one series of the openings are in registry with the beads (as the upper series in Figure 7), the remaining openings will be free for oil flow. Thus the containers 17 and 18 may be telescoped together without the necessity of aligning the holes 53 and 54 and in such manner as to permit the overall height of the cartridge to be increased or decreased slightly without interfering with the oil flow through the openings 53 and 54. Sometimes when the cartridge is installed, the limiting ring 25 might not be moved its full extent, and the possibility of non-registry of the openings as a result of such a possibility is immaterial.

To insure that oil may flow through the openings 55 and 56 of the tubes 29 and 30, the openings are made large enough so that in any position of telescoping movement they will be open to each other, as obvious from an inspection of the drawing.

In order to prevent "channeling" through the filtering material 19 and 20, after the container 17 has been filled (as in Figure 9), a spring may be placed thereon which will compress to the position shown in Figure 1 when the filtering material containers are telescoped together. The spring 43 tends to keep the filtering material properly compacted instead of letting it gravitate to the bottom of the filter cartridge after some use of the filter. This I have found effectively prevents the undesirable condition of channeling through the filtering material. When the oil distributor of Figure 3 is used two of the springs 43 are provided, one placed below the distributor discs and the other above them.

It is preferable to provide a bail such as indicated at 58 on the filter cartridge to facilitate removal thereof. The bail 58 has terminal ends bent inwardly and pivotally connected in brackets 59 secured to the top of the cartridge. The bail may normally assume a supine position, as shown in Figure 1, or an elevated position, as shown by dotted lines in Figure 2, for convenience in removal of the cartridge.

From the foregoing description, it is obvious that I have provided an oil filter cartridge which is both adjustable and repackable. This eliminates the necessity of carrying several sizes of oil filter cartridges in stock and cuts down the expense of replacement to a minimum, inasmuch as the only expense necessary for replacement is the filtering material itself, which is quite inexpensive. The job of repacking is simplified to a minimum, and by making the containers 17 and 18 so that they telescope for a considerable distance, the filtering material may be divided and placed in them and then compacted by telescoping them together, without any possibility of the filtering material squeezing out at undesirable points.

Having described certain specific embodiments of my invention together with the operation thereof, I desire it to be understood that these forms are selected merely for the purpose of facilitating disclosure of the invention rather than for the purpose of limiting the number of forms which it may assume. It is to be further understood that various modifications, adaptations and alterations may be applied to the specific forms disclosed to meet the requirements of practice without in any manner departing from the spirit and scope of the present invention except as set forth in the claims appended hereto, which are drawn to the modifications of the invention shown in Figures 3 to 7, whereas the claims in the parent application are directed to Figures 1 and 2 and to certain features of the other figures which are common to all of the figures.

I claim as my invention and desire to secure by Letters Patent of the United States:

1. In a repackable, adjustable oil filter cartridge having an inlet and an outlet, a pair of filtering material cup-shaped containers each having an open end, at least one of said containers having perforations therein, said containers being adjustably telescoped together, said containers having tubes secured thereto, said tubes being disposed at the centers of said containers to adjustably telescope relative to each other and each container being packed with a separate quantity of filtering material surrounding said tubes, an oil distributor including a tube for adjustably telescoping over said first tubes, a hollow perforated distributor member positioned between said two quantities of filtering material and secured to said last tube, and means affording passage of oil from said inlet through one of said container tubes and through said tube of said oil distributor, said oil then passing through the perforated distributor and through the filtering material to the outlet, all of said tubes being of a size relative to each other as to permit the passage of oil between them and having contracted ends to provide substantially oil-tight connections between the tubes.

2. In a repackable oil filter cartridge having an inlet and an outlet, a pair of cup-shaped filtering material containers each having an open end, at least one of said containers being perforated, said containers being telescoped together, said containers each having a tube secured thereto, said tubes being disposed at the center of said containers to telescope relative to each other and each container being packed with a separate quantity of filtering material surrounding said tubes, an oil distributor including a tube for telescoping over said first tubes, a hollow perforated distributor member secured to said last tube to be positioned between said separate quantities of filtering material, and means affording passage of oil from said inlet through one of said container tubes and through said tube of said oil distributor, said oil then passing through the perforated distributor and through the filtering material to the outlet.

3. In a repackable, adjustable oil filter cartridge, a pair of cup-shaped filtering material containers each having an open end, at least one of said containers having perforations therein, said containers being telescoped together, adjustable means for limiting the telescoping movement, said containers having tubes secured thereto and disposed at their centers to telescope relative to each other, each container being packed with a separate quantity of filtering material surrounding said tubes, an oil distributor including a tube for telescoping over said first tubes and a hollow perforated distributor member secured to said last tube and adapted to be positioned between said separate quantities of filtering material, means for conveying oil to said distributor, and means for conveying oil from said cartridge after it has passed through said filtering material.

4. In a repackable, adjustable oil filter cartridge including an inlet and an outlet, a pair of filtering material containers each having an open end and a closed end, at least one of said containers being perforated, said containers being telescoped together and having tubes secured to said closed end and disposed at their centers to telescope relative to each other, each of said containers being packed with a separate quantity of filtering material surrounding said tubes, an oil distributor including a tube telescoping over said first tubes and a hollow perforated distributor member secured to said last tube and adapted to be positioned between said separate quantities of filtering material, and means affording passage of oil from said inlet through one of said container tubes and through said tube of said oil distributor, said oil then passing through said perforated distributor and the filtering material to said outlet, all of said tubes being of a size relative to each other as to permit the passage of oil between them.

5. In a repackable oil filter cartridge including an inlet and an outlet, a pair of filtering material containers each having an open end and a closed end, at least one of said containers being perforated, said containers being telescoped together, said containers having tubes secured thereto and disposed at their centers to telescope relative to each other and each container being packed with a separate quantity of filtering material surrounding said tubes, an oil distributor including a tube for telescoping over said first tubes and a hollow distributor member secured to said last tube and adapted to be positioned between said separate quantities of filtering material, and means affording passage of oil from said inlet through one of said container tubes and through said tube of said oil distributor, said oil then passing through said perforated distributor and the filtering material to said outlet.

CLARK M. BOLSER.

REFERENCES CITED

The following references are of record in the file of this patent:

UNITED STATES PATENTS

| Number | Name | Date |
| --- | --- | --- |
| 515,769 | Harris | Mar. 6, 1894 |
| 2,153,062 | Harlan et al | Apr. 4, 1939 |
| 2,158,512 | Layte et al | May 16, 1939 |
| 2,201,418 | Williams et al | May 21, 1940 |
| 2,247,445 | Long | July 1, 1941 |
| 2,320,990 | White | June 8, 1943 |
| 2,364,617 | Bolser | Dec. 12, 1944 |